Patented June 22, 1954

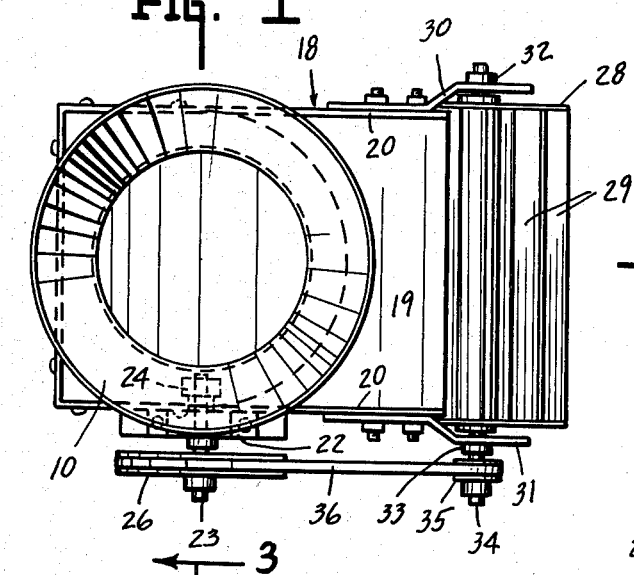
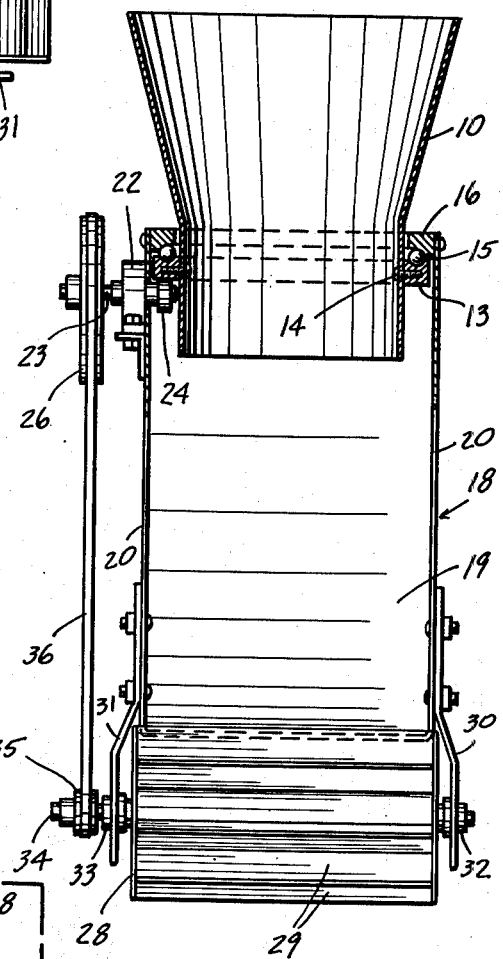
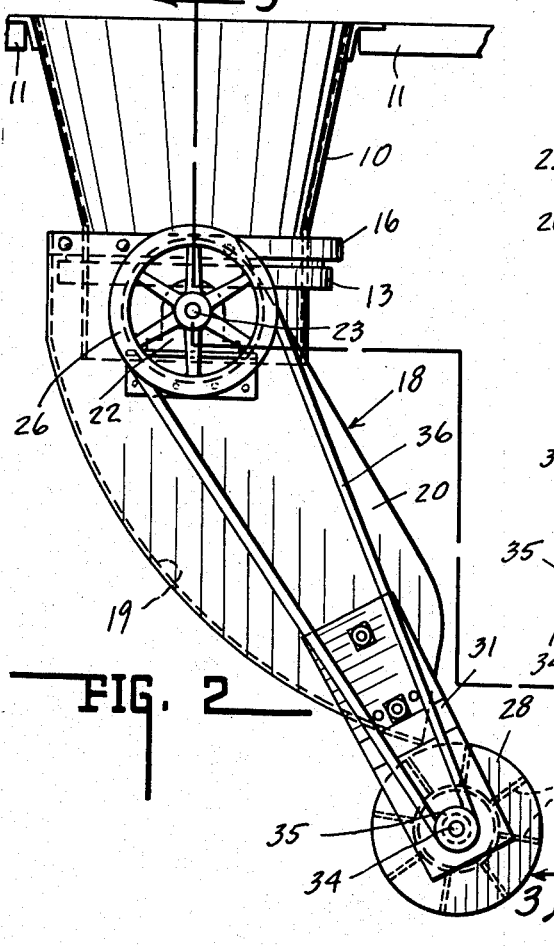
June 22, 1954 — A. J. FRIEDMAN ET AL — 2,681,726
SILAGE DISTRIBUTOR
Filed April 30, 1952
INVENTORS.
ANDREW J. FRIEDMAN.
CHARLES E. HAMLIN.
BY AMOS M. EINERSON.
Lockwood, Galt, Woodard & Smith
ATTORNEYS.

2,681,726

UNITED STATES PATENT OFFICE 2,681,726

SILAGE DISTRIBUTOR

Andrew J. Friedman, West Lafayette, Charles E. Hamlin, Lafayette, and Amos M. Einerson, West Lafayette, Ind.

Application April 30, 1952, Serial No. 285,203

5 Claims. (Cl. 198—128)

This invention relates generally to devices for spreading bulk fibrous materials such as ensilage or the like, as well as shelled corn and small grains, as they are conveyed to a storage bin or silo, and more particularly the invention relates to a self-propelled spreading device for handling materials of this character.

The prior art includes various types of spreading devices, many of which include propelling devices such as paddle wheels mounted in a delivery spout of a conveyor or the delivery spout of an ensilage cutter. Being within a confined space in a spout, ensilage, in particular, tends to pack around the propelling wheel to such an extent that the wheel may eventually stop rotating, and the spout may be entirely clogged. A stoppage of this nature can be serious as the ensilage becomes tightly packed through an appreciable length of the spout, and, therefore, considerable time and labor is necessary to clear a clogged spout.

Accordingly, the principal object of this invention is to provide a self-propelled material spreading apparatus adapted to cooperate with a conveyor or delivery spout and in which the moving parts are separate and apart from the delivery spout itself.

Another object of this invention is to provide a material spreading apparatus adapted to cooperate with a conveyor or delivery spout, and which will not cause stoppages in the conveyor or delivery spout.

In accordance with this invention there is provided an apparatus for spreading material comprising a funnel adapted to cooperate with a conveyor or a delivery spout, a chute rotatably mounted thereon, a driving connection between the chute and the funnel, and a paddle wheel mounted on the free end of the chute and having a driving linkage connected to said drive connection whereby material passing over said paddle wheel imparts motion thereto, and in turn motion to said chute.

The full nature of the invention will be understood from the accompanying drawings and the following description and claims:

Fig. 1 of the drawings is a top plan view of the material spreading device.

Fig. 2 is a side elevation view of the apparatus shown in Fig. 1.

Fig. 3 is a front elevation in partial cross section taken on line 3—3 of Fig. 2.

Referring to the drawings, there is provided, in accordance with this invention, a material spreading device comprising a funnel 10 which is adapted to receive material such as ensilage, sand, gravel or the like, from a conveyor or a delivery spout (not shown). Funnel 10 may be fixed to a bracket 11 or to other suitable structures which may be attached to the interior structure of a silo or bin of similar character which is customarily used for storing the particular material which is being handled.

Funnel 10 is provided with an annular bearing race 13 bolted by means of bolts such as 14 to the lower portion thereof. The bearing race supports ball bearings 15 which in turn cooperate with an upper annular bearing race 16 thereby to form a rotatable supporting structure for a chute 18. Chute 18 may comprise a sheet metal structure having a floor 19 and side walls 20, the upper periphery of which may be riveted or otherwise fastened to the upper bearing race 16. Chute 18 supports a pillow block 22 within which is rotatably mounted a shaft 23 for supporting a friction wheel 24 adapted to engage the under side of bearing race 13. Shaft 23 also supports a belt pulley 26.

For driving the belt pulley 26 there is provided a paddle wheel 28 having radially disposed paddles 29 and being rotatably mounted at the free end of chute 18 by means of oppositely disposed straps 30 and 31. The straps may support journals 32 and 33 for rotatably mounting the shaft 34 of wheel 28. At the left hand end of shaft 34 there may be mounted a belt pulley 35 for driving a belt 36 mounted thereon, and also on pulley 26.

In operation, silage, sand, gravel, small grains or like bulk materials may be conveyed or delivered through a spout or other suitable conveying means into the funnel 10, whereupon the material falls into the chute 18 and passes over the paddle wheel 28. In so doing, paddle wheel 28 is rotated thereby to drive pulley 35, belt 36, pulley 26 and friction wheel 24. Since wheel 24 is mounted on chute 18, and funnel 10 is held in fixed position, rotation of wheel 28 causes the chute to rotate about the vertical axis of funnel 10. As the chute 18 rotates, the material passing through it is distributed in a circular path into the bin or silo.

From the foregoing description it will be apparent that all of the material which is being handled is kept free of the bearing races 13 and 16 and the friction wheel 24. The wheel 28 being at the free end of the chute is in a completely unconfined space, and hence the material, which is being handled, can not clog the delivery spout or any of the working parts of the spreading device itself.

The invention claimed is:

1. Apparatus for spreading material as it is delivered to a silo or other storage structure comprising a stationary material guiding member for receiving said material from a conveying apparatus, an inclined material guiding member extending under said stationary member for receiving material therefrom and rotatably supported on said stationary member, means connecting said inclined member to said stationary member for rotating said inclined member about said stationary member, a freely rotatable wheel mounted outwardly of said inclined material guiding member and including portions disposed in the way of said material whereby said material rotates said wheel and a drive connection between said wheel and said connecting means for imparting rotary movement to said inclined member.

2. Apparatus for spreading material as it is delivered to a silo or other storage structure comprising a stationary material guiding member for receiving said material from a conveying apparatus, an inclined open chute extending under said member for receiving material therefrom and rotatably supported on said member, means connecting said chute with said member for rotating said chute about said member, a freely rotatable paddle mounted on said chute in the way of said material whereby said material rotates said paddle wheel and a drive connection between said paddle wheel and said chute rotating means for imparting rotary movement to said chute.

3. Apparatus for spreading material as it is delivered to a silo or other storage structure comprising a funnel for receiving said material from a conveying apparatus, an inclined open chute extending under said funnel for receiving material therefrom and including means rotatably supported on said funnel, a means connecting said chute with said funnel for rotating said chute about said funnel, a freely rotatable paddle wheel mounted on said chute in the way of said material whereby said material rotates said paddle wheel and a drive connection between said paddle wheel and said chute rotating means for imparting rotary movement to said chute.

4. Apparatus for spreading material as it is delivered to a silo or other storage structure comprising a funnel for receiving said material from a conveying apparatus, an inclined chute extending under said funnel for receiving material therefrom and including means rotatably supported on said funnel, a friction wheel mounted on said chute in engagement with said funnel for rotating said chute about said funnel, a freely rotatable wheel including radial vanes mounted at the lower end of said chute in the way of said material whereby said material rotates said chute wheel and a drive connection between said chute wheel and said friction wheel for imparting rotary movement to said friction wheel and said chute.

5. Apparatus for spreading material as it is delivered to a silo or other storage structure comprising a funnel for receiving said material from a conveying apparatus, an annular bearing fixed to the lower end of said funnel, an inclined chute extending under said funnel for receiving material therefrom and including an annular bearing rotatably supported on said funnel bearing, a friction wheel mounted on said chute in engagement with said funnel bearing for rotating said chute about said funnel, a freely rotatable wheel including radial vanes mounted at the lower end of said chute in the way of said material whereby said material rotates said chute wheel and a belt connection between said chute wheel and said friction wheel for imparting rotary movement to said friction wheel and said chute.

References Cited in the file of this patent

UNITED STATES PATENTS

| Number | Name | Date |
|---|---|---|
| 2,318,881 | Mundy | May 11, 1943 |

FOREIGN PATENTS

| Number | Country | Date |
|---|---|---|
| 7,241 | Great Britain | May 1, 1889 |